United States Patent
Sakai

(10) Patent No.: US 7,302,615 B2
(45) Date of Patent: Nov. 27, 2007

(54) METHOD AND SYSTEM FOR ANALYZING LOOP INTERFACE FAILURE

(75) Inventor: Tomohiro Sakai, Tokyo (JP)

(73) Assignee: NEC Corporation, Minato-ku, Tokyo (JP)

( * ) Notice: Subject to any disclaimer, the term of this patent is extended or adjusted under 35 U.S.C. 154(b) by 619 days.

(21) Appl. No.: 10/652,482

(22) Filed: Sep. 2, 2003

(65) Prior Publication Data

US 2004/0042408 A1    Mar. 4, 2004

(30) Foreign Application Priority Data

Sep. 3, 2002    (JP) ............................. 2002-257545

(51) Int. Cl.
*G06F 11/00* (2006.01)
(52) U.S. Cl. ............................. 714/43; 714/4; 370/222; 370/223
(58) Field of Classification Search ............... None
See application file for complete search history.

(56) References Cited

U.S. PATENT DOCUMENTS

| | | | |
|---|---|---|---|
| 6,990,530 B1* | 1/2006 | Gibson et al. | ............... 709/238 |
| 7,035,206 B2* | 4/2006 | Brewer et al. | ............... 370/222 |
| 2001/0011357 A1* | 8/2001 | Mori | ............... 714/25 |
| 2001/0014956 A1* | 8/2001 | Nagata et al. | ............... 714/8 |
| 2002/0191537 A1* | 12/2002 | Suenaga | ............... 370/221 |
| 2004/0153914 A1* | 8/2004 | El-Batal | ............... 714/724 |
| 2007/0053285 A1* | 3/2007 | Beer et al. | ............... 370/222 |

FOREIGN PATENT DOCUMENTS

| | | |
|---|---|---|
| JP | 2000-347812 | 12/2000 |
| JP | 2001-216206 | 1/2001 |
| JP | 2001-167039 | 6/2001 |
| JP | 2001-222385 | 8/2001 |
| JP | 2002-7077 | 1/2002 |

* cited by examiner

*Primary Examiner*—Michael Maskulinski
(74) *Attorney, Agent, or Firm*—McGinn IP Law Group PLLC

(57) ABSTRACT

A disk array apparatus is provided, which has dual FC-Als to each of which an enclosure service unit connects, and is capable of performing loop diagnoses including detachment and reconnection of devices even when abnormalities occur in all loops. The enclosure service units can communicate each other through an interface. Heartbeat monitors, when detecting that heartbeat commands transmitted through the FC-Als have ceased in both loops, detach all disks connecting to the FC-Als to thereby resolve the loop abnormalities. Then, loop diagnostic units cooperatively perform loop diagnoses including reconnection of disks to the FC-Als, identify faulty disks, detach the faulty disks, so as to continue the operation of the system.

27 Claims, 8 Drawing Sheets

METHOD AND SYSTEM FOR ANALYZING LOOP INTERFACE FAILURE

BACKGROUND OF THE INVENTION

1. Field of the Invention

The present invention relates to a method for analyzing loop interface failures and a system having a function of analyzing loop interface failures.

2. Description of the Related Art

Recently, an interface which connects devices in a loop such as a Fibre Channel Arbitrated Loop (FC-AL) has been widely used in disk array apparatuses and the like, since it has a simple connecting configuration of cables and can easily accommodate device extensions. However, this type of interface has such a problem that, when signals cannot propagate in the loop because of failures or the like in interface circuits of connected devices (this is called, for example, loop abnormality or link down), the whole loop cannot be used. That is, even though a failure occurs in only one device, all devices connected to the loop cannot be used. In order to cope with this problem, disk array apparatuses usually have interface circuits for two ports, so that these devices are connected to two independent loops. With this configuration, even when one loop of the dual loop interfaces is out of use because of a failure or the like, accesses can be performed using the other loop, to thereby improve reliability. Further, this kind of disk array apparatus has a function of identifying a faulty device and restoring the failure when a loop abnormality occurs.

As an example, the Japanese Patent Application Laid-open No. 2002-7077 discloses a disk array apparatus having two FC-ALs, or loops A and B. In this example, when an abnormality occurs in the loop A, a disk controller in the loop A stops the normal disk processing and transits to a temporary degenerate state, and the loop B acts the processing for the loop A. The disk controller in the loop A performs a diagnosis of the loop A by itself and bypasses the faulty device from the loop A to thereby clear the temporary degenerate state of the loop A. With this structure, it is possible to identify a faulty component while keeping response to the host, when a loop abnormality occurs. However, in the aforementioned example, a loop abnormality is supposed to be an intermittent failure. Therefore, it is assumed that the loop A is not abnormal at the time of diagnosing the loop A.

As another example, the Japanese Patent Application Laid-open No. 2001-216206 discloses a method for analyzing failures, which is applicable to disk array apparatuses having two FC-ALs, or loops A and B, in which an enclosure service device directly connects to each loop. An enclosure service device is a device for monitoring the environment inside of the casing and managing resources of a device which conforms to the ANSI Standard (NCITS 305-199X). The device also has a function of controlling a loop connection switching unit which performs bypassing or releasing the bypass of disks connecting to the loop, to which the device itself connects. The enclosure service device directly connecting to the loop acts as a device connecting to the loop interface as same as the disk connecting to the loop. Therefore, when a unique failure occurs in the loop to which the enclosure service device connects, the disk controller of the loop cannot instructs the enclosure service device through the loop. In order to cope with this problem, in the aforementioned example, an interface is provided between the enclosure service devices connecting to respective loops. The interface works in such a manner that when a failure occurs in the loop A, it instructs the enclosure service device in the loop A to bypass or release the bypass of disks in the loop A, via the enclosure service device in the loop B, for diagnosing the loop A.

As described above, in the system of disk array apparatus having a loop interface such as an FC-AL, the reliability is improved by using dual loop interfaces and bypassing faulty components through an immediate failure analysis at the time of loop abnormality. However, in the system in which enclosure service devices directly connect to respective loops, some other problems arise as described below, when loop failures occur in the both loops of the dual loop interfaces at the same time.

A first problem is that the devices connecting to the loop interfaces cannot be detached from or reconnected to the loops at all, since the enclosure service devices for controlling the loop connection switching units, which actually perform detachment and reconnection, cannot be accessed from either loop.

A second problem is that a loop diagnosis for identifying faulty devices, which cause the loop abnormalities, cannot be performed. In order to perform the loop diagnosis, the devices connecting to the loop interfaces must be detached from and reconnected to the loops. However, the detachment and the reconnection cannot be performed in the system.

A third problem is that the system remains completely stopped, since the loop diagnosis cannot be performed so that faulty components cannot be removed from the loops.

SUMMARY OF THE INVENTION

The present invention is proposed considering these problems. An object of the present invention is, in a system of a disk array apparatus or the like having multiplexed loop interfaces in which controlling devices such as enclosure service devices connect to respective loops, to perform detachment and reconnection of devices connecting to the loop interfaces, and to perform loop diagnoses so as to identify faulty devices causing loop abnormalities, to thereby prevent the system from being completely stopped, even when abnormalities occur in all loops.

A method for analyzing loop interface failures according to the present invention is for a system of a disk array apparatus or the like, which includes multiplexed loop interfaces such as FC-Als. In such a system, controlling devices such as enclosure service devices, for controlling loop connection switching means which connect/detach devices such as hard disk devices to/from the respective loop interfaces, connect to the respective loop interfaces, and interfaces are provided so that the controlling devices can communicate each other. When the controlling devices detect that abnormalities occur in all loop interfaces, the controlling devices control the loop connection switching means so as to detach all devices connecting to at least one of the loop interfaces.

It should be noted that the controlling devices may be configured in the following manner. That is, when detecting that commands such as heartbeat commands have ceased, which commands are transmitted at a regular interval through the loop interfaces to which the controlling devices themselves connect, the controlling devices inform to other controlling devices through the interfaces that the commands have ceased, and when all controlling devices detect that the commands have ceased, they detect that abnormalities occur in all loop interfaces. Further, in the method, loop diagnoses for identifying faulty devices may be performed by accessing to a controlling device connecting to another loop interface, via the controlling device connecting to the loop interface in which all connected devices were detached and the loop abnormality has been resolved. Further, when abnormalities occur in all loop interfaces, a controller, connecting to the devices and to the controlling device through one loop interface of the multiplexed loop interfaces, may judge whether the loop abnormality of the loop interface to which it connects is resolved within a certain period of time, and when the loop abnormality was resolved within the certain period of time, inquire the controlling device whether it detached all devices. If all devices were detached by the controlling device, countermeasure processing against a double-loop link failure may be performed, which includes the loop diagnosis by a loop diagnostic means. Further, the devices determined as faulty in the loop diagnosis may be detached from the loop interface so that the loop interface can be in use again. Further, the loop diagnosis for identifying faulty devices may be performed by accessing to a controlling device connecting to another loop interface, via the controlling device connecting to the loop interface which is in use again.

A system having a function of analyzing loop interface failures according to the present invention is a system of a disk array apparatus or the like, and comprises, multiplexed loop interfaces such as FC-Als, and controlling devices such as enclosure service devices having functions of controlling loop connection switching means for connecting/detaching devices such as hard disk devices to/from the respective loop interfaces. The controlling devices include, interfaces for communicating each other, and means for controlling the loop connection switching means when detecting abnormalities in all loop interfaces, so as to detach all devices connecting to at least one of the loop interfaces.

It should be noted that the controlling device may include means for detecting that commands such as heartbeat commands have ceased, which commands are transmitted at a regular interval through the loop interface to which the controlling device itself connects, and informing to other controlling devices through the interfaces that the commands have ceased, and when all controlling devices detect that the commands have ceased, they detect that abnormalities occur in all loop interfaces. Further, the system may include loop diagnostic means for performing loop diagnoses to identify faulty devices by accessing to a controlling device connecting to another loop interface, via the controlling device connecting to the loop interface in which all connected devices were detached and the loop abnormality has been resolved.

Further, the system may include a controller connecting to the devices and to the controlling device through one loop interface of the multiplexed loop interfaces. The controller may, when loop abnormalities occur in all loop interfaces, judge whether the loop abnormality in the loop interface to which it connects is resolved within a certain period of time, and when the loop abnormality was resolved within the certain period of time, inquire the controlling device whether it detached all devices, and when all devices were detached by the controlling device, perform countermeasure processing against a double-route link failure including a loop diagnosis by a loop diagnostic means.

The loop diagnostic means may detach the devices determined as faulty in the loop diagnoses from the loop interface so that the loop interface can be in use again. Further, the loop diagnostic means may perform the loop diagnoses for identifying faulty devices by accessing to a controlling device connecting to another loop interface, via the controlling device connecting to the loop interface which is in use again.

The enclosure service device of the present invention connects to one loop interface of the multiplexed loop interfaces such as FC-Als and has a function of controlling a loop connection switching means for connecting/detaching devices such as hard disk devices to/from the loop interfaces. The enclosure service device includes an interface for communicating with another enclosure service device each other and a means for controlling the loop connection switching means when abnormalities occur in all loop interfaces so as to detach all devices connecting to the loop interface.

It should be noted that the enclosure service device of the present invention may include means for detecting that commands have ceased, which commands are transmitted at a regular interval through the loop interface to which the device itself connects, and informing to other enclosure service devices through the interfaces that the commands have ceased, and when all enclosure service devices detect that the commands have ceased, the enclosure service devices detect that abnormalities occur in all of the loop interfaces.

The controller of the present invention is a controller such as a disk controller or the like which, through one loop interface of the multiplexed loop interfaces such as FC-Als, connects to one or more devices such as hard disk devices and to a controlling device such as an enclosure service device having a function of controlling a loop connection switching means for connecting/detaching the devices to/from the loop interface. The controller includes, a means for confirming that all devices connecting to at least one of the loop interfaces have been detached by the controlling device which detected that abnormalities occurred in all of the multiplexed loop interfaces, and a loop diagnostic means for performing a loop diagnosis to identify a faulty device by accessing to a controlling device connecting to another loop interface through the interface connecting the controlling devices so as to communicate each other, via the controlling device connecting to the loop interface in which all devices were detached and the loop abnormality has been resolved.

The loop diagnostic means of the controller according to the present invention may detach the devices determined as faulty in the loop diagnosis from the loop interface so that the loop interface can be in use again. Further, the loop diagnostic means may perform the loop diagnosis for identifying faulty devices by accessing to a controlling device connecting to another loop interface, via the controlling device connecting to the loop interface which is in use again.

(Operation)

In the present invention, it is detected in the controlling devices connecting to respective loop interfaces that abnormalities occur in all of the multiplexed loop interfaces. The controlling devices, upon detection, voluntarily control the loop connection switching means to thereby detach all devices connecting to at least one loop interface. Consequently, if the cause of the loop failure is a fault of any device, the loop abnormality of the loop interface, from which all devices were detached, is resolved and the controlling device connecting to the loop interface can be accessed. Since the controlling devices can communicate each other through interfaces, it is possible to access other controlling devices via controlling devices which have been able to be accessed. Therefore, devices connecting to any loop interface can be detached and reconnected. Accordingly, it is possible to perform loop diagnoses for identifying faulty devices causing loop abnormalities, and by detaching the faulty devices, it is also possible to continue operation of the system.

PREFERRED EMBODIMENT OF THE INVENTION

Next, a preferred embodiment will be explained in detail with reference to the accompanying drawings.

(Structure)

Figure 1:
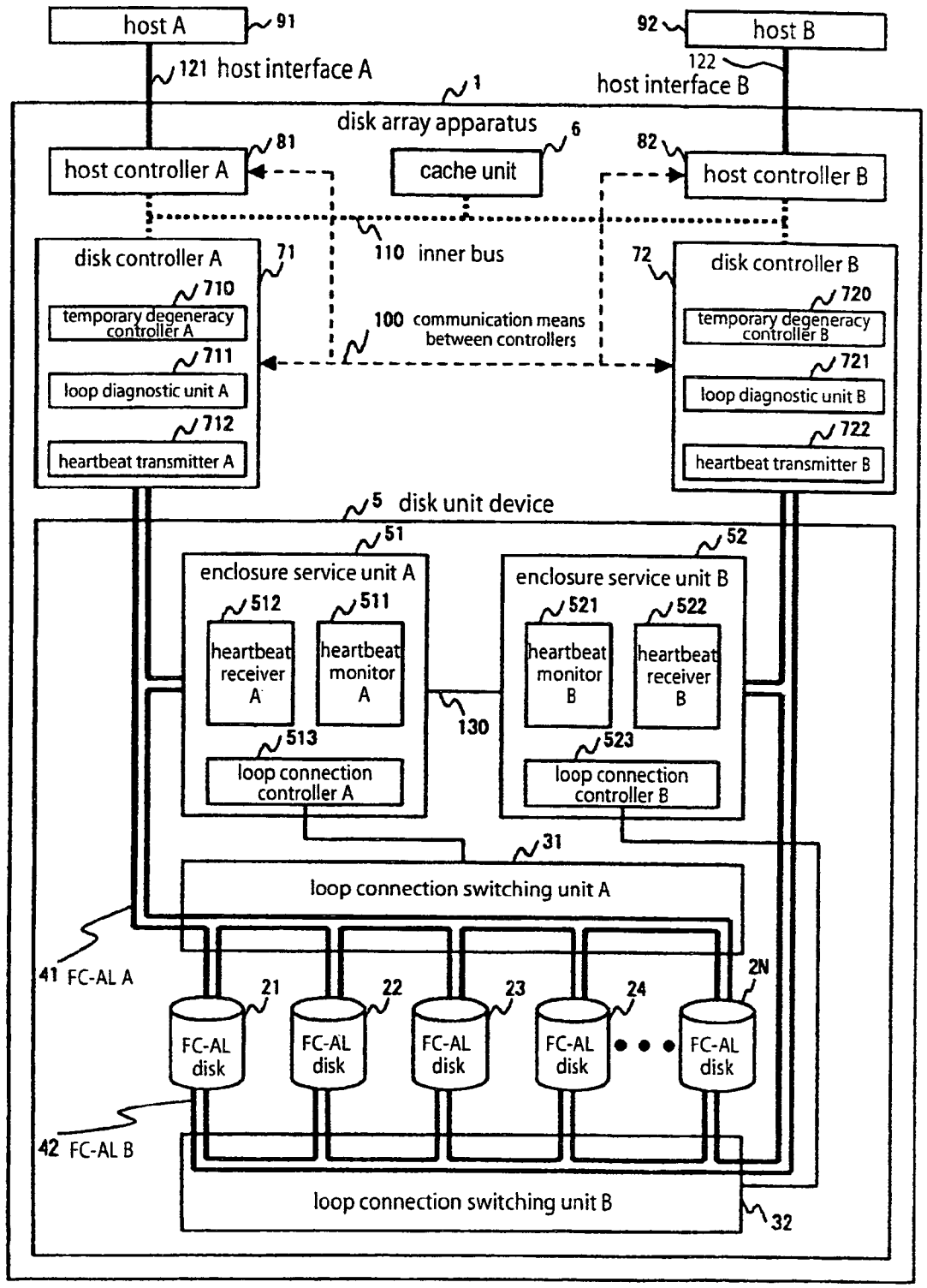
FIG. 1 is a block diagram showing an example of a disk array apparatus to which the present invention is applied.

Referring to FIG. 1, a disk array apparatus 1 according to an embodiment of the present invention connects to hosts A 91 and B 92 via host interfaces A 121 and B 122. The disk array apparatus comprises a disk unit device 5, a cache unit 6, a disk controller A 71, a disk controller B 72, a host controller A 81, and a host controller B 82.

The host controllers A 81 and B 82 perform host services such as command reception, data transfer, status response between the disk array apparatus and the hosts A 91 and B 92, respectively. The host controllers A 81 and B 82 connect to the cache unit 6 and to disk controllers A 71 and B 72 through an inner bus 110, so as to perform data transmission/reception amongst each other. The host controllers A 81 and B 82 and the disk controllers A 71 and B 72 perform requests for processing such as disk processing to other controllers, and status information of controllers such as information of loop analysis result, via a communication means between controllers 100.

The disk unit device 5 includes: a plurality of FC-AL disks 21 to 2N, each of which has two FC-AL interface ports; loop connection switching units A 31 and B 32; and enclosure service units A 51 and B 52.

The loop connection switching units A 31 and B 32 are circuits, by which the FC-AL disks 21 to 2N are detached from (hereinafter referred to as bypassed) or reconnected to (hereinafter referred to as released from bypass) the FC-ALs A 41 and B 42.

The enclosure service units A 51 and B 52 connect to the disk controllers A 71 and B 72 via the FC-ALs A 41 and B 42. The enclosure service units A 51 and B 52 have an interface 130 for communicating each other. The enclosure service units A 51 and B 52 are devices for monitoring the inner circumstances and managing the inner resources of devices defined by the ANSI Standard (NCITS 305-199X), and include heartbeat monitors A 511 and B 521, heartbeat receivers A 512 and B 522, and loop connection controllers A 513 and B 523.

The loop connection controllers A 513 and B 523 have functions of controlling the loop connection switching units A 31 and B 32 so as to bypass or release the bypass of the FC-AL disks 21 to 2N.

The heartbeat receivers A 512 and B 522 have functions of receiving commands transmitted at an interval of a certain period of time from the disk controllers A 71 and B 72 through the FC-ALs A 41 and B 42. The commands transmitted from the disk controllers A 71 and B 72 at an interval of a certain period of time are called heartbeat commands hereinafter. The heartbeat commands may be commands defined as dedicated commands or well-known commands (for example, Receive Diagnostic Results command).

The heartbeat monitors A 511 and B 521 monitor receiving conditions of the heartbeat commands at the heartbeat receivers A 512 and B 522, which are in the enclosure service units A 51 and B 52 in which the heartbeat monitors A 511 and B 521 are included, respectively. The heartbeat monitors A 511 and B 521, when detecting that reception of the heartbeat commands have ceased in the heartbeat receivers A 512 and B 522, inform the state to the other heartbeat monitors B 521 and A 511, respectively, through the interface 130. The heartbeat monitors A 511 and B 521 have functions of, when detecting that receptions of the heartbeat commands have ceased in both heartbeat receivers A 512 and B 522, bypassing all FC-AL disks 21 to 2N from the FC-ALs A 41 and B 42 by the loop connection controllers A 513 and B 523. The enclosure service units A 51 and B 52 have functions of, in the case that the receptions of commands have ceased and all disks have been bypassed, recording the state inside and reporting that bypass has been performed responding to inquiries from the disk controllers A 71 and B 72. The reporting function to inquiries may be realized as, for example, a responding function to the Receive Diagnostic Results commands.

Figure 2:
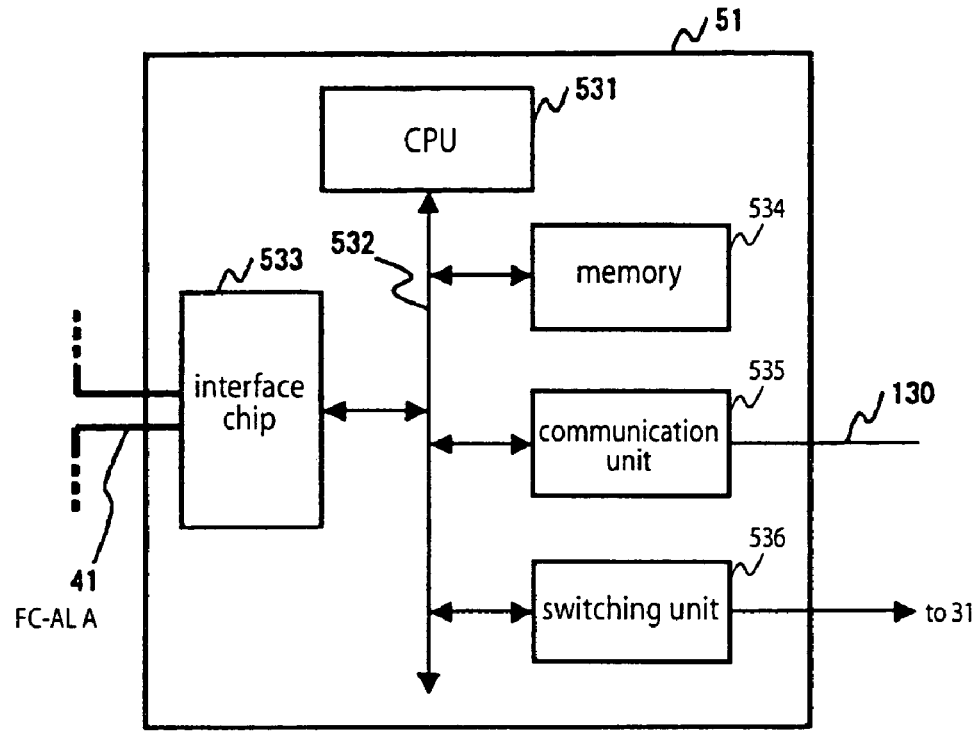
FIG. 2 is a block diagram showing an example of the inner structure of an enclosure service unit according to a disk array apparatus to which the present invention is applied.

FIG. 2 shows an example of the inner structure of the enclosure service unit A 51. Since the enclosure service unit B 52 has the same structure, only the enclosure service unit A 51 is explained in FIG. 2. The enclosure service unit A 51 shown in FIG. 2 includes a CPU 531, an interface chip 533 connecting to a bus 532 of the CPU 531, a memory 534, a communication unit 535, and a switching unit 536. The interface chip 533 is a portion of the interface between the enclosure service unit A 51 and the FC-AL A 41. The communication unit 535 is a device for communicating each other with the enclosure service unit B 52 via the interface 130. The switching unit 536 is formed of, for example, a register for retaining control signals for the loop connection switching unit A 31 and the like. The memory 534 is formed of ROM and RAM, and has an area for storing programs for the enclosure service device (including firmware) as well as storing status information showing the status of the own device and each device connected to the FC-AL A 41, and the like. The CPU 531 executes the programs for the enclosure service device stored in the memory 534 to thereby control the whole device and realize functions necessary for the device.

Referring to FIG. 1 again, the disk controller A 71 forms the FC-AL A 41 between only one port in each of the FC-AL disks 21 to 2N, and the other disk controller B 72 forms the FC-AL B 42 between the other port in each of the FC-AL disks 21 to 2N. The disk controllers A 71 and B 72 perform various disk processing such as reading from and writing to the FC-AL disks 21 to 2N with instructions from the host controllers A 81 and B 82, or by their own determinations of the disk controllers A 71 and B 72. Further, the disk controllers A 71 and B 72 also instruct the enclosure service units A 51 and B 52 to bypass or release the bypass of the FC-AL disks 21 to 2N, and read information of bypass state and the like from the enclosure service units A 51 and B 52. Further, the disk controllers A 71 and B 72 include temporary degeneracy controllers A 710 and B 720, loop diagnostic units A 711 and B 721, and heartbeat transmitters A 712 and B 722, respectively.

The heartbeat transmitters A 712 and B 722 issue heartbeat commands at an interval of a certain period of time to the heartbeat receivers A 512 and B 522, which are components of the enclosure service units A 51 and B 52, respectively. The heartbeat receivers A 512 and B 522 which are components of the enclosure service units A 51 and B 52, as aforementioned, receive the issued heartbeat commands. The heartbeat monitors A 511 and B 521 monitor reception status of the heartbeat commands and when detect that heartbeat commands have ceased in both heartbeat receivers A 512 and B 522, all FC-AL disks 21 to 2N are detached from both FC-ALs A 41 and B 42. The period of time, by which the heartbeat monitors A 511 and B 522 determine that the receptions of the heartbeat commands have ceased, may be set by the disk controllers A 71 and B 72. The heartbeat transmitters A 712 and B 722 issue commands to the heartbeat receivers A 512 and B 522 at an interval shorter than the period for determining that the commands receptions cease.

The loop diagnostic units A 711 and B 721 have functions of, when loop abnormalities occur, performing loop diagnoses including bypass and release the bypass of the FC-AL disks in cooperation with each other.

The temporary degeneracy controllers A 710 and B 720 have functions of controlling cooperation between the host controllers A 81 and B 82 and the disk controllers A 710 and B 720 in order to continue responding to the hosts A 91 and B 92 during loop diagnoses.

Figure 3:
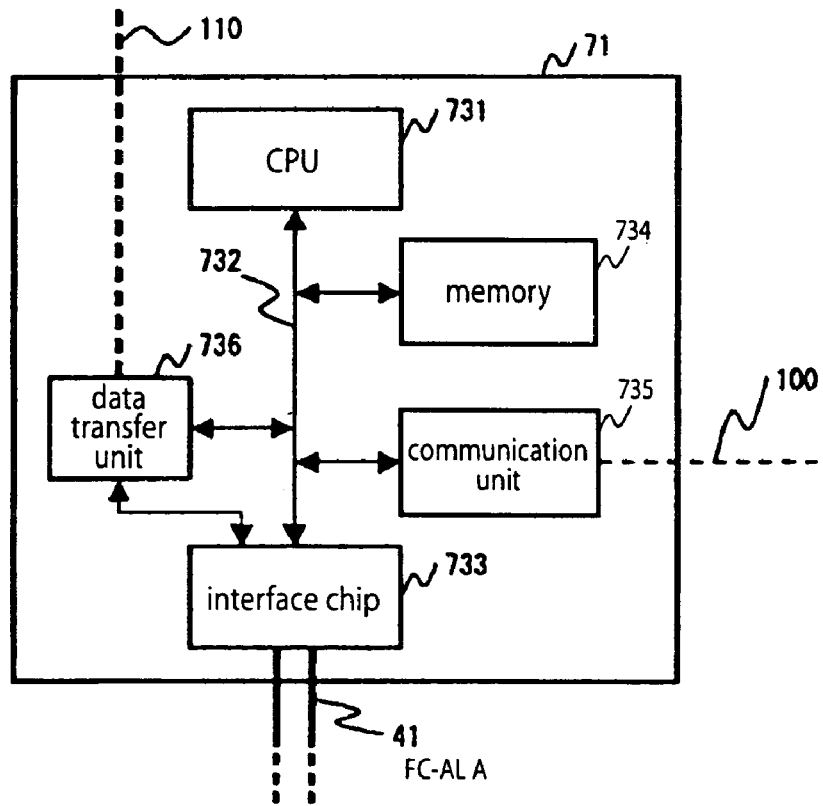
FIG. 3 is a block diagram showing an example of the inner structure of a disk controller according to a disk array apparatus to which the present invention is applied.

FIG. 3 shows an example of the inner structure of the disk controller A 71. Since the disk controller B 72 has the same structure, FIG. 3 only shows the disk controller A 71. The disk controller A 71 shown in FIG. 3 comprises a computer, which includes a CPU 731, an interface chip 733 connecting a bus 732 of the CPU 731, a memory 734, a communication unit 735, and a data transfer unit 736 including a DMA (dynamic memory access) controller and the like. The interface chip 733 is a portion of the interface between the disk controller A 71 and the FC-AL A 41. A loop abnormality detecting mechanism in the disk controller A 71 is typically provided in the interface chip 733. The communication unit 735 is a device for communicating each other with other controllers via a communicating means between controllers 100. The data transfer unit 736 is a device for exchanging data with other controllers through an inner bus 110, as well as exchanging data with the enclosure service unit A 51 and each of the disks 21 to 2N through the interface chip 733 and the FC-AL A 41. The memory 734 including ROM and RAM stores programs for letting a computer as the disk controller execute the aforementioned function of the disk controller (including firmware). The CPU 731 executes programs for the disk controller stored in the memory 734 to thereby control the whole disk controller and realize functions necessary for the disk controller.

(Operation)

Next, the operation of the disk array apparatus according to the present embodiment will be explained.

Referring to FIG. 1, the host controllers A 81 and B 82 which received instructions from the hosts A 91 and B 92 recognize such necessary information as logic disk numbers (LUN), instruction code types, and logic block addresses (LBA). For example, the host controller A 81 and B 82 which received read instructions from the hosts A 91 and B 92, immediately transfer data from the cache unit 6 to the host A 91 and B 92, if the designated data exists in the cache unit 6. If the designated data does not exist in the cache unit 6, the host controllers A 91 and B 92 instruct the disk controllers A 71 and B 72 to store data read out from the FC-AL disks 21 to 2N in the cache unit 6, and when the data is stored in the cache unit 6, transfer the data to the host A 91 and B 92. Further, if the host controllers A 81 and B 82 received write instructions from the host A 91 and B 92, for example, they store the data received from the hosts A 91 and B 92 in the data in the cache unit 6. This data is written in the FC-AL disks 21 to 2N by the disk controllers A 71 and B 72, through instructions from the host controllers A 81 and B 82 to the disk controllers A 71 and B 72 to write the data into the disks, or through detection by the disk controllers A 71 and B 72 that unwritten data exists in the cache unit 6. Generally, the two disk controllers A 71 and B 72 are used to share the FC-AL disks 21 to 2N to which processing is assigned, so as to divide the loads.

Next, a process, when loop abnormalities occur in the FC-AL A 41 and the FC-AL B 42, will be explained.

When a loop abnormality occurs only in the FC-AL A 41, signals cannot propagate on the FC-AL A 41. Therefore, the disk controller A 71 detects the state as same as conventional examples. At this time, the heartbeat commands, which are regularly transmitted by the heartbeat transmitter A 712 in the disk controller A 71, have not been received in the heartbeat receiver A 512 any more, so that the heartbeat monitor A 511 detects that a loop abnormality occurs in the FC-AL A 41. In this case, since the other FC-AL B 42 is in the normal state, a control for bypassing disks 21 to 2N from the FC-AL A 41 is not performed.

In contrast, when a loop abnormality occurs only in the FC-AL B 42, signals cannot propagate on the FC-AL B 42. Therefore, the disk controller B 72 detects the state as same as conventional examples. At this time, the heartbeat commands, which are regularly transmitted by the heartbeat transmitter B 722 in the disk controller B 72, have not been received in the heartbeat receiver B 522 any more, so that the heartbeat monitor B 521 detects that a loop abnormality occurs in the FC-AL B 42. In this case, since the other FC-AL A 41 is in the normal state, a control for bypassing disks 21 to 2N from the FC-AL B 42 is not performed.

When loop abnormalities occur in both FC-Als A 41 and B 42, the disk controller A 71 detects the loop abnormality in the FC-AL A41, and the disk controller B 72 detects the abnormality in the FC-AL B 42. Further, the heartbeat monitors A 511 and B 521 in the enclosure service units A 51 and B 52 detect that loop abnormalities occur in both FC-Als A 41 and B 42. Then, according to an instruction from the loop connection controller A 513, the loop connection switching unit A 31 is controlled, so that all disks 21 to 2N are bypassed from the FC-AL A 41. At the same time, the loop connection switching unit B 32 is controlled according to an instruction from the loop connection controller B 523, so that all disks 21 to 2N are bypassed from the FC-AL B 42.

Figure 4:
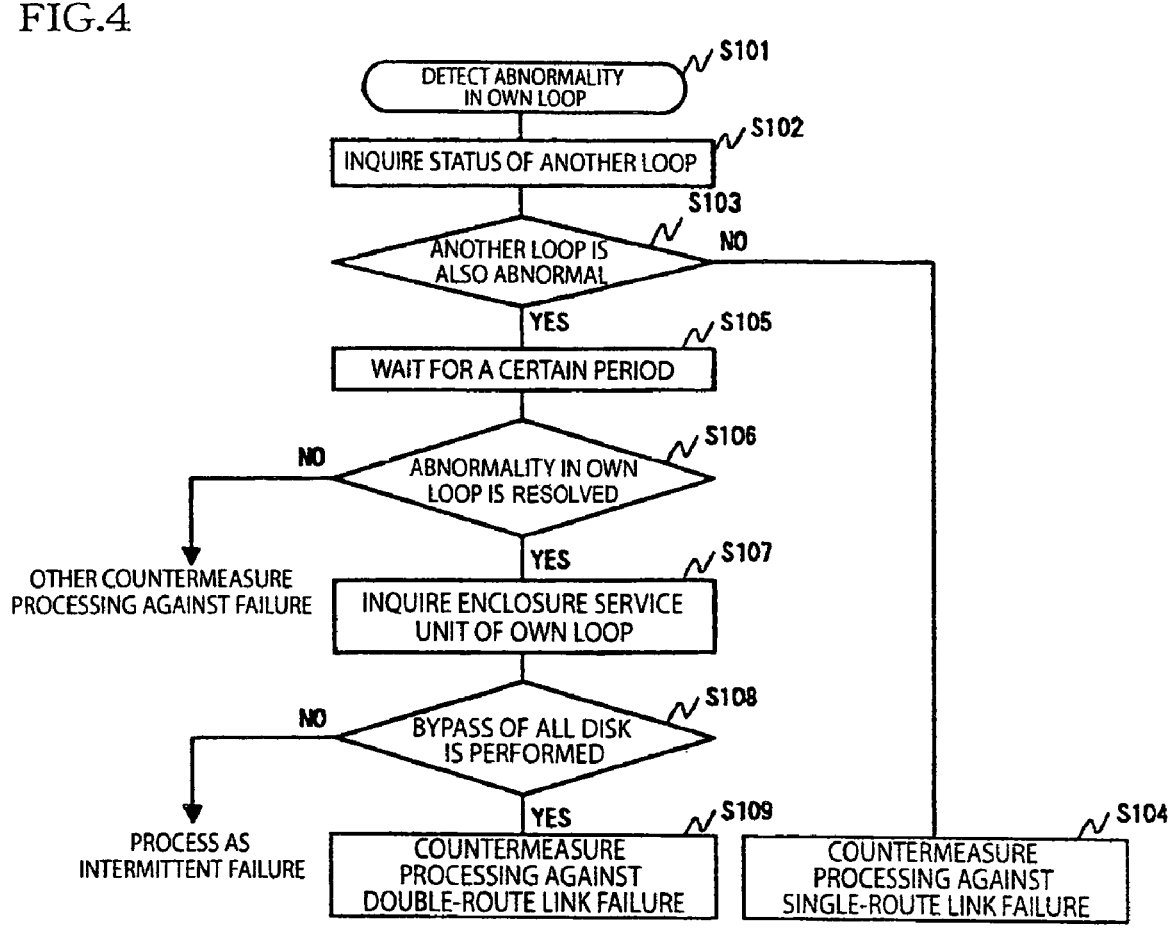
FIG. 4 is a flowchart showing an example of a process when a disk controller of a disk array apparatus detects a loop abnormality.

FIG. 4 is a flowchart showing a processing example when the disk controllers A 71 and B 72 detect loop abnormalities in their own loops. Since the disk controllers A 71 and B 72 perform the same processing, only the disk controller A 71 will be explained below as an example. The function of the disk controller shown in FIG. 4 is formed as a program for letting the computer, which acts as the disk controller, execute. The function of the disk controller is performed by letting the computer execute this program.

The disk controller A 71, when detects a loop abnormality in the FC-AL A 41 (S101), inquires the disk controller B 72 about the loop status of another FC-AL B 42 via the communicating means between controllers 100 (S102). Responding to the inquiry, the disk controller B 72 replies to the disk controller A 71 whether the loop status of the FC-AL B 42 is normal or abnormal via the communicating means between controllers 100. If the FC-AL B 42 is not in the abnormal state but in the normal state (NO in S103), the disk controller A 71 performs countermeasure processing against a single-route link failure, which is the process for a case that a loop abnormality occurs in only one loop. The details of the countermeasure processing against a single-route link failure will be explained later. On the other hand, if a loop abnormality occurs in the FC-AL B 42 as well (YES in S103), the disk controller A 71 proceeds to the step S105.

In the step S105, the disk controller A 71 waits for a certain period of time. The waiting period is a little longer than a period necessary for the enclosure service units A 51 and B 52 to voluntarily bypass the disks 21 to 2N from the FC-Als A 41 and B 42 when the loop abnormalities occur in both FC-Als A 41 and B 42. When the waiting period passed, the disk controller A 71 judges whether the loop abnormality of the FC-AL A 41 is resolved (S106). If the abnormality of the own loop is resolved (YES in S106), the disk controller A 71 inquires the enclosure service unit A 51 that whether all disks 21 to 2N were bypassed since receptions of the heartbeat commands ceased in both loops, through the FC-AL A 41 in which the loop abnormality is resolved (S107). Responding to the inquiry, if the enclosure service unit A 51 replies that it bypassed all disks (YES in S108), the disk controller A 71 performs countermeasure processing against a double-routes link failure, which is a process performed when loop abnormalities occur in both FC-Als A 41 and B 42 (S109). The details of the countermeasure processing against a double-route link failure will be described later.

On the other hand, when the enclosure service unit A 51 replies that no bypass of all disks was performed (NO in S108), the disk controller A 71 proceeds on the understanding that the loop abnormality was an intermission failure and was naturally cured. For a case that the disk controller A 71 waited for a certain period of time in the step S105 but the loop abnormality in the FC-AL A 41 was not resolved (NO in S106), the cause of the loop abnormality exits in devices other than the disks 21 to 2N, for example a failure of the enclosure service unit A 51 itself. Therefore, the disk controller A 71 performs countermeasure processing against failure corresponding to the cause. Since the countermeasure processing against failure is not directly related to the present invention, the explanation is omitted.

Figure 5:
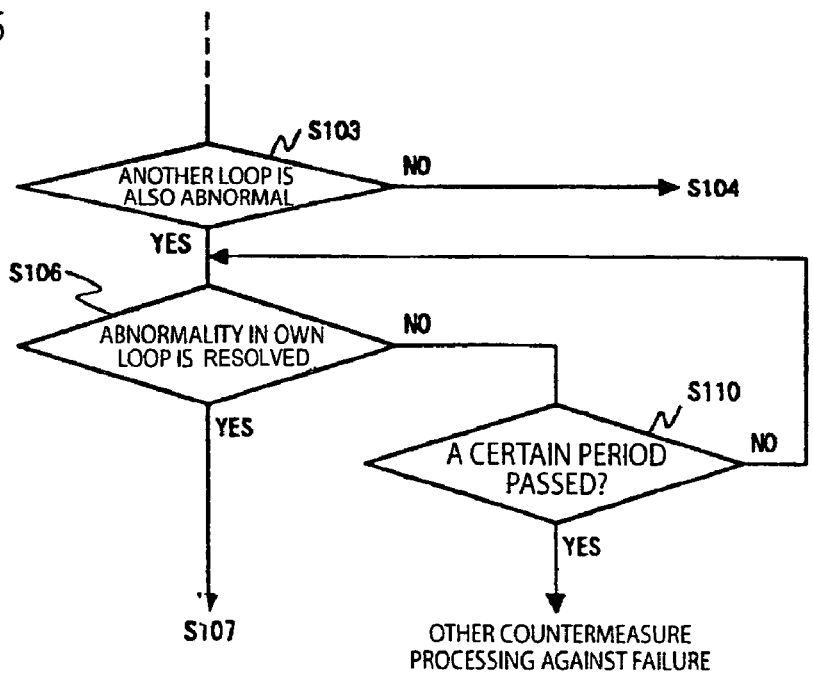
FIG. 5 is a flowchart showing another example of a process when a disk controller of a disk array apparatus detects a loop abnormality.

In the example of processing in FIG. 4, when the other loop is also in the abnormal state (YES in S103), the disk controller A 71 waits for a certain period of time (S105) and then judges whether the abnormal state of the own loop is resolved (S106). However, this part of processing may be changed to that shown in FIG. 5. That is, when the other loop is also in the abnormal state (YES in S103), the disk controller performs processing including the process of S106 for judging whether the abnormal state of the own loop has been resolved and the process of S110 for judging whether a certain period of time has passed. If the abnormal state of the own loop has been resolved, the disk controller A 71 proceeds to the step S107, and if the abnormality of the own loop has not been resolved although a certain period of time passed (YES in S110), proceeds to other countermeasure processing against failure. In FIG. 4, it is necessary to wait for a certain period of time even though the loop failure was an intermission failure and was resolved immediately. However, the process shown in FIG. 5 has an advantage that such a waiting period is not needed.

Next, the countermeasure processing against a single-route link failure in the step S104 will be explained with an example that a loop abnormality occurs in the FC-AL A 41. Of course, the same operation is performed in the case of the FC-AL B 42.

Figure 6:
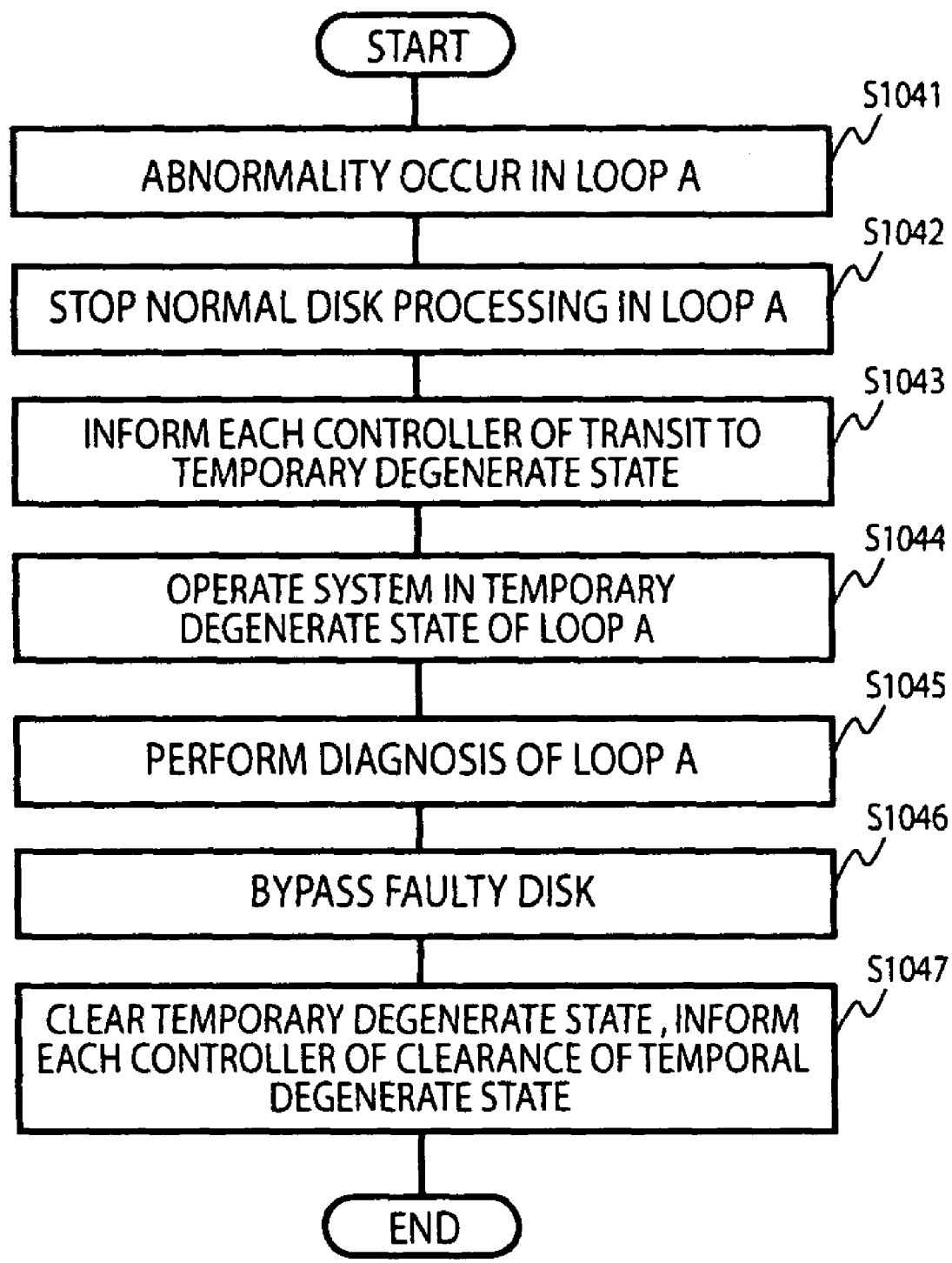
FIG. 6 is a flowchart showing an example of a countermeasure processing against a single-route link failure.

FIG. 6 is a flowchart showing an example of the countermeasure processing against a single-route failure (S104). This processing is formed as a program. By letting the computer execute this program, the processing shown in FIG. 6 is performed. As an example, assuming that a loop abnormality such as link down continues in the FC-AL A 41 caused by a fault in any one of the FC-AL disks 21 to 2N (S1041). In this state, the disk controller A 71 cannot access to the enclosure service unit A 51 and the FC-AL disks 21 to 2N. The temporary degeneracy unit A 710 in the disk controller A 71 stops executing the normal disk processing (S1042) (the state in which the normal function stops is called a temporary degeneracy state), and informs the host controllers A 81 and B 82, and the other disk controller B 72 that the state is transited to the temporary degeneracy state (temporary degeneracy information) (S1043).

The disk controller B 72 and the host controllers A 81 and B 82, upon receipt of the temporary degeneracy information, operate the system in the temporary degenerate state of the loop A (S1044). More specifically, the temporary degeneracy controller B 720 in the disk controller B 72, which received the temporary degeneracy information, first resets the FC-AL disks 21 to 2N, and cancels remaining processes in the FC-AL disks 21 to 2N caused by abandonment of disk processing by the regenerated disk controller A 71. Further, the disk controller B 72 performs disk processing instructed by the host controllers A 81 and B 82, and disk processing determined by itself, for all of the FC-AL disks 21 to 2N. On the other hand, the host controllers A 81 and B 82, upon receipt of the temporary degeneracy information, request to the substitute disk controller B 72 to perform uncompleted disk processing which has been requested to the degenerated disk controller A 71. Further, during the time that the disk controller A 71 is temporary degenerated, every disk processing by the new host I/O is requested to the substitute disk controller B 72. Accordingly, since the disk controller B 72 succeeds processing during the time of the disk controller A 71 being degenerated, it is possible to continue responding to the hosts.

Next, the loop diagnostic unit A 711 in the disk controller A 71 which is temporary degenerated and the loop diagnostic unit B 721 in the disk controller B 72 cooperate each other to perform diagnostic processing for identifying a faulty component of the disks 21 to 2N connected to the FC-AL A 41 (S1045). A specific example of the loop diagnostic processing of the step S1045 will be described below.

First, the loop diagnostic unit A 711 in the disk controller A 71 instructs, via the communicating means between controllers 100, the loop diagnostic unit B 721 in the disk controller B 72 to bypass, for example, the disk 21 among the FC-AL disks 21 to 2N. The disk controller B 72, upon receipt of the instruction, instructs the enclosure service unit B 52 of the same bypass, through the FC-AL B 42, and the enclosure service unit B 52 instructs the enclosure service unit A 51 of the same bypass, through the interface 130. The loop connection controller A 513 in the enclosure service unit A 51, upon receipt of the instruction, controls the loop connection switching unit A 31 so as to detach the disk 21 from the FC-AL A 41. The disk controller A 71 judges whether the loop abnormality in the FC-AL A 41 has been resolved, and if resolved, identifies the disk 21 as the faulty disk. On the other hand, if the loop abnormality still continues, the next disk 22 is bypassed from the FC-AL A 41 with the same procedure as that of the disk 21, and checked whether the disk 22 is the faulty disk or not. This process is repeated through the last disk 2N until the faulty disk is identified.

Figure 7:
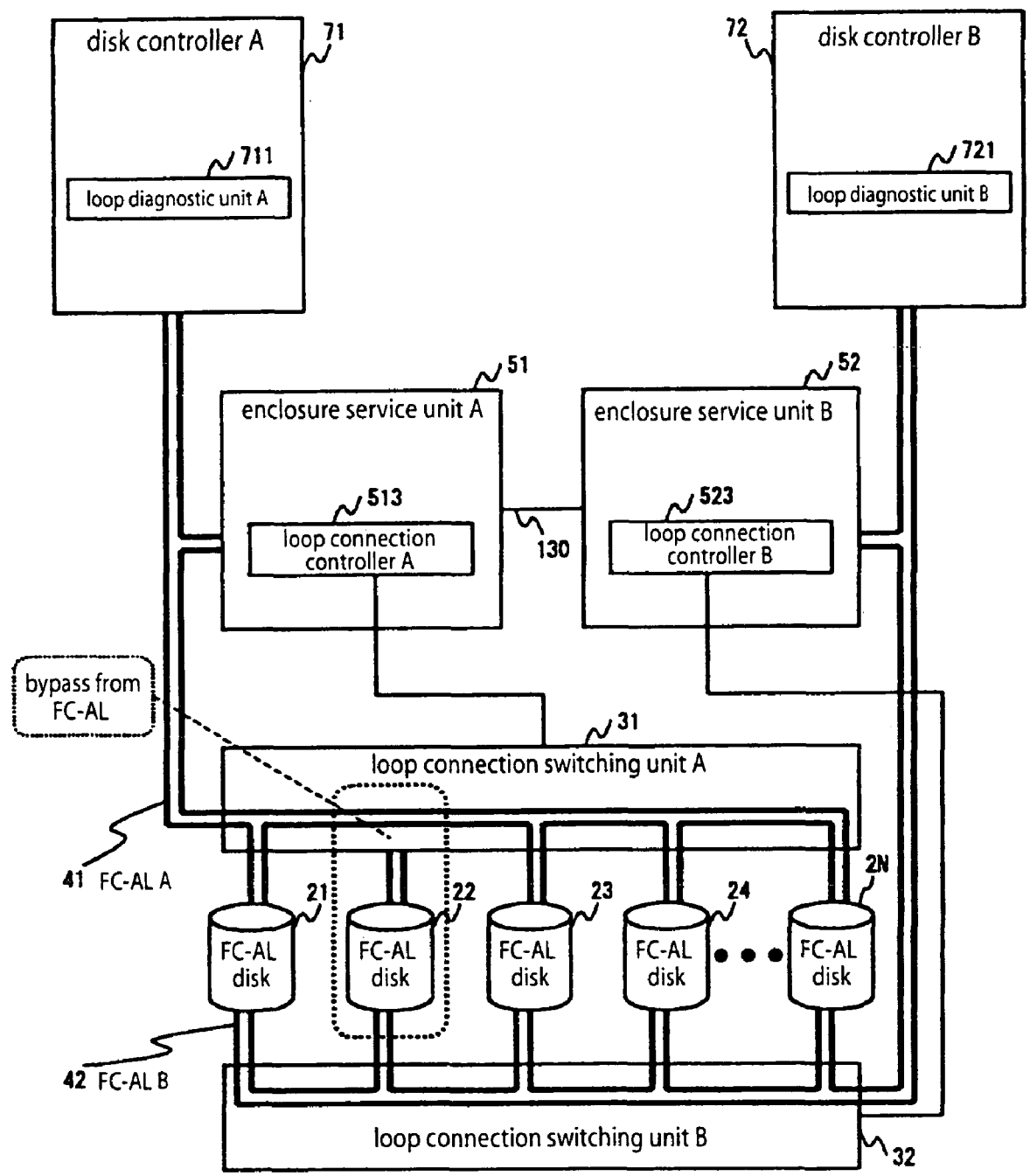
FIG. 7 is a diagram showing a state of a disk array apparatus in which a faulty disk is detached and only normal disks are connected.

When the faulty disk is identified through this process, the disk controller A 71 detaches the faulty disk and releases the normal disks from bypass so as to reconnects them to the FC-AL A 41 (step S1046). For example, in a case that the disk 22 is the faulty disk, only the faulty disk 22 is detached from the FC-AL A 41 and the normal disks are connected to the FC-AL A 41, as shown in FIG. 7.

Subsequently, the disk controller A 71 informs, via the communicating means between controller 100, the host controllers A 81 and B 82 and the other disk controller B 72 that the temporary degenerate state has been cleared and transited to the normal state (temporary degeneracy cleared information) (S1047). The disk controller A 71, which cleared the temporary degenerate state, resumes disk processing of the normal function. The disk controller B 72, when received the temporary degeneracy cleared information, stops processing of the disks handled by the disk controller A 71 in which the temporary degenerate state was cleared, and takes charge of processing the remaining disks including the disk bypassed from the other loop through the loop diagnosis. The host controllers A 81 and B 82, upon receipt of the temporary degenerate cleared information, request disk processing to the disk controllers A 71 and B 72 corresponding to the aforementioned handling of the disks. As for the disk determined as faulty, it is informed to the maintenance staff or users that the disk is required to be replaced, by a maintenance terminal (not shown) connecting to the disk array apparatus 1 or a host (not shown) for managing the disk array connected through a host path or the like.

The specific example of the loop diagnostic processing described above is just an example and the present invention is not limited to the aforementioned example. For example, a loop diagnosis may be performed with the procedure shown in FIG. 5 of the aforementioned second conventional example, that is, the Japanese Patent Laid-open No. 2001-216206. Further, it may be performed in such a manner that all disks 21 to 2N connecting to the FC-AL A 41 are bypassed for a while and releasing them one by one so as to check each disk for a failure. Next, the countermeasure processing against a double-route link failure (S109) shown in FIG. 4 will be explained.

Figure 8:
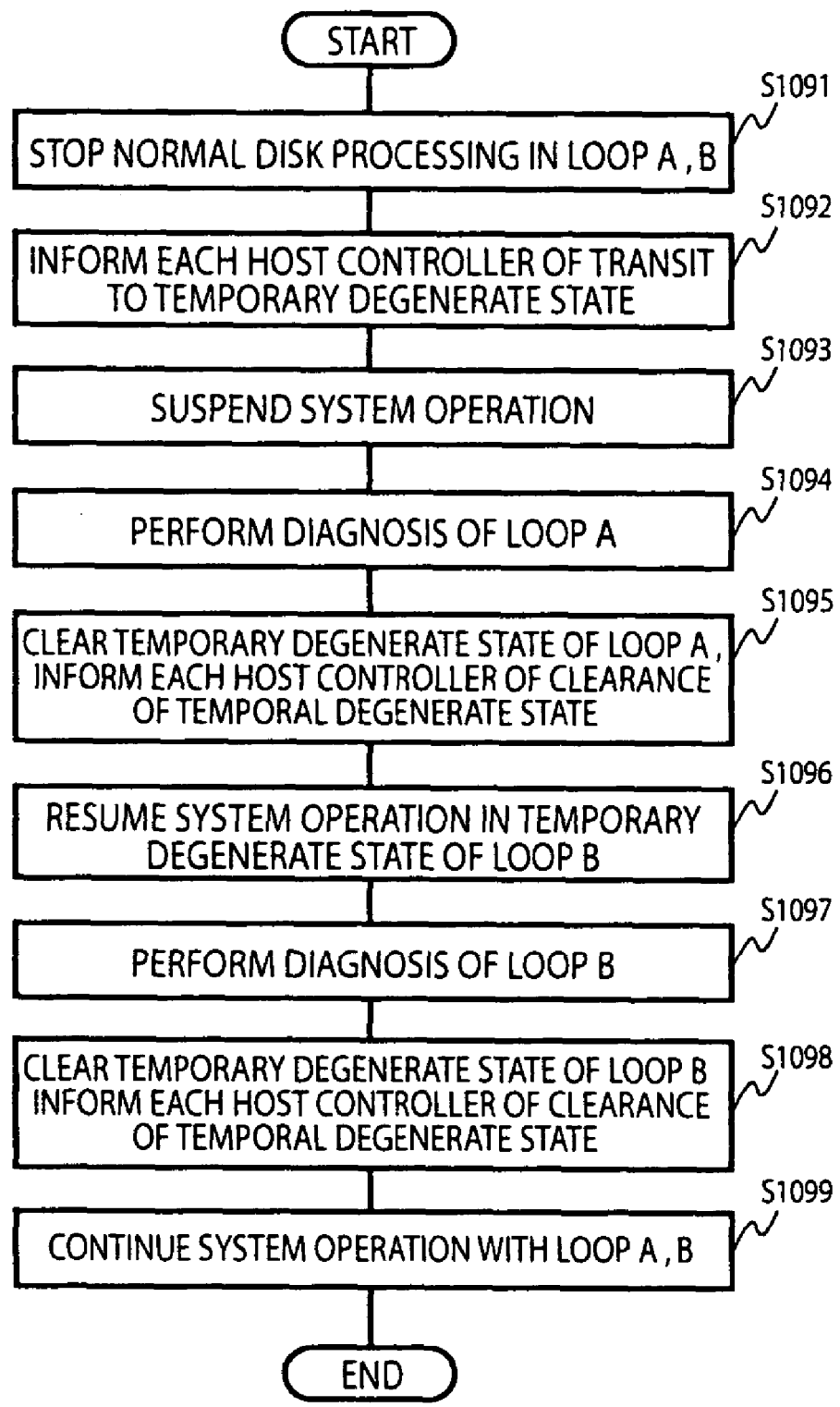
FIG. 8 is a flowchart showing an example of countermeasure processing against a double-route link failure.

FIG. 8 is a flowchart showing an example of the countermeasure processing against a double-system link failure S109. This processing is formed as a program. By letting the computer execute this program, the processing shown in FIG. 8 is performed. Before starting the countermeasure processing against a double-route link failure, all disks 21 to 2N are bypassed from the FC-AL A 41 and B 42 by the enclosure service units A 51 and B 52. In this state, both disk controllers A 71 and B 72 cannot perform normal disk processing. Therefore, the temporary degeneracy controllers A 710 and B 720 in the disk controllers A 71 and B 72 stop normal disk processing and let the state to be a temporary degenerate state (S1091), and inform the host controllers A 81 and B 82 that the state transited to the temporary degenerate state (temporary degeneracy information) (S1092), via the communicating means between controllers 100. The host controllers A 81 and B 82, upon receipt of the temporary degeneracy information, suspend to receive requests form the hosts A 91 and B 92, since all disk controllers A 71 and B 72 are in the temporary degenerate state (S1093).

Next, the loop diagnostic units A 711 and B 721 in the disk controllers A 71 and B 72 first cooperatively perform diagnostic processing for identifying a faulty component among a plurality of disks 21 to 2N connecting to either one of FC-ALs, for example, the FC-AL A 41 (S1094). A specific example of the loop diagnostic processing of the step S1094 will be explained below.

First, the loop diagnostic unit A 711 in the disk controller A 71 instructs, via the communicating means between controllers 100, the loop diagnostic unit B 721 in the disk controller B 72 to connect (release the bypass of) a disk among the FC-AL disks 21 to 2N, for example, the disk 21 to the FC-AL A41. The disk controller B 72, upon receipt of the instruction, instructs through the FC-AL B 42 the enclosure service unit B 52 to release the bypass as well, and the enclosure service unit B 52 instructs the enclosure service unit A 51 to release the bypass as well through the interface 130.

The loop connection controller A 513 of the enclosure service unit A 51, upon receipt of the instruction, controls the loop connection switching unit A 31 to connect the disk 21 to the FC-AL A 41. The disk controller A 71 judges whether the loop abnormality of the FC-AL A 41 occurs again, and if so, identifies the disk 21 as the faulty disk. If the loop abnormality does not occur again, the disk 21 is identified as a normal disk.

In a case that the disk 21 is identified as a faulty disk, the loop diagnostic unit A 711 of the disk controller A 71 instructs the enclosure service unit A 51 to bypass the disk 21, through the same channel as used in instructing the release of the bypass, that is, a channel via the communicating means between controllers 100, the loop diagnostic unit B 721, the enclosure service unit B 52, and the interface 130. Then, after detaching the faulty disk 21 from the FC-AL A 41, the loop diagnostic unit A 711 performs a diagnosis of the disk 22 as same as that of the disk 21.

In a case that the disk 21 is not the faulty disk, the loop diagnostic unit A 711 performs a diagnosis of the disk 22 as same as that of the disk 21 while the disk 21 connects to the FC-AL A 41. This procedure is repeated for all remaining disks. When the loop diagnosis of the FC-AL A 41 completed, only the normal disks connect to the FC-AL A 41.

The above explanation illustrates a case that when the disk controller A 71 connects the disks 21 to 2N to the FC-AL A 41, the instruction to release the bypass is transmitted through the other disk controller B 72, the FC-AL B 42, and the enclosure service unit B 52. However, the instruction to release the bypass may be directly transmitted to the enclosure service unit A 51 through the FC-AL A 41. It should be noted that if a disk, released from the bypass, is the faulty disk, the loop abnormality occurs again in the FC-AL A 41. Therefore, when detaching the disk again, it is required to transmit the instruction of the bypass to the enclosure service unit A 51 via the other disk controller B 72, the FC-AL B 42, and the enclosure service unit B 52.

Subsequently, the disk controller A 71 informs the host controllers A 81 and B 82, by the communicating means between controllers 100, that the temporary degenerate state of the loop A is cleared and transited to the normal state (temporary degenerate cleared information) (S1095). With this information, the operation of the system resumes in the temporary degenerate state of the loop B (S1096). The host controllers A 81 and B 82, which received the temporary degenerate cleared information of the loop A, request the disk controller A 71, in which the temporary degenerate state is cleared, to perform the uncompleted disk processing again which has been requested to the disk controllers A 71 and B 72 which are temporary degenerated. Further, the host controllers A 81 and B 82 resume accepting requests from the hosts A 91 and B 92, and request the disk controller A 71 to perform every disk processing by the new host I/O. The disk controller A 71 cancels disk processing remaining in the all normal FC-AL disks, and then performs disk processing instructed by the host controllers A 91 and B 92 and disk processing determined by the disk controller A 71, for the all normal FC-AL disks. With this process, it is possible to minimize the period in which the system operation completely stops.

Next, the loop diagnostic unit A 711 in the disk controller A 71 which cleared the temporary degeneracy and the loop diagnostic unit B 721 in the disk controller B 72 which is temporary degenerated, cooperatively perform diagnostic processing to identify a faulty component among the disks 21 to 2N connecting to the FC-AL B 42 (S1097). The loop diagnostic processing of the step S1097 is performed as follows, as same as the processing of the step S1094.

First, the loop diagnostic unit B 721 of the disk controller B 72 instructs the enclosure service unit B 52 to connect (release the bypass of) a disk, for example, the disk 21, among the FC-AL disks 21 to 2N via the communicating means between controllers 100, the loop diagnostic unit 711 in the disk controller A 71, the FC-AL A 41, the enclosure service unit A 51, and the interface 130. The loop connection controller B 523 in the enclosure service unit B 52, upon receipt of the instruction, controls the loop connection switching unit B 32 so as to connect the disk 21 to the FC-AL B 42. The disk controller B 72 judges whether the loop abnormality occurs in the FC-AL B 42 again, and if so, identifies the disk 21 as a faulty disk. If the loop abnormality does not occur again, the disk 21 is identified as a normal disk. In the case that the disk 21 is identified as a faulty disk, the loop diagnostic unit B 721 of the disk controller B 72 instructs the loop connection switching unit B 32 to bypass the disk 21, through the same channel as used in instructing the release of the bypass. Then, after detaching the faulty disk 21 from the FC-AL B 42, the loop diagnosis unit B 52 performs diagnosis of the disk 22 as same as that of the disk 21.

In the case that the disk 21 is not the faulty disk, the loop diagnostic unit B 52 performs a diagnosis of the disk 22 as same as that of the disk 21 while the disk 21 connects to the FC-AL B 42. This procedure is repeated for all remaining disks. When the loop diagnosis of the FC-AL B 42 completed, only the normal disks connect to the FC-AL B 42. Same as the case of the step S1094, the disk controller B 72 may transmit the instruction of releasing the bypass directly to the enclosure service unit B 52 through the FC-AL B 42.

Subsequently, the disk controller B 72 informs, by the communicating means between controllers 100, the host controllers A 81 and B 82 and the other disk controller A 71 that the temporary degenerate state of the loop B has been cleared and transited to the normal state (temporary degenerate cleared information) (S1098). With this process, the operation of the system continues using both loops A and B (S1099). That is, the disk controller B 72 which cleared the temporary degenerate state resumes disk processing of the normal function. The disk controller A 71, upon receipt of the temporary degenerate cleared information, stops processing of disks of which the disk controller B 72 cleared the temporary degenerate takes charge. The host controllers A 81 and B 82, upon receipt of the temporary degenerate cleared information of the loop B, request disk processing to the disk controllers A 71 and B 72 corresponding to their responsibilities to the aforementioned disks. It should be noted that as for the disk determined as faulty, it is informed to the maintenance staff or the users by a maintenance terminal (not shown) connecting to the disk array apparatus 1 or a host for managing the disk array connecting via a host path that the disk is required to be replaced.

The aforementioned specific example of the loop diagnosis described in the steps S1094 and S1097 is just an example, and the present invention is not limited to this specific example. As an example of the diagnostic method in the step S1094, it is acceptable to connect a plurality of disks at the same time. That is, connecting a half number of disks to the FC-AL A 41 at the same time and if a loop abnormality does not occur, connecting the remaining half number of disks to the FC-AL A 41 at the same time. In this case, if a loop abnormality occurs when connecting a plurality of disks, it means that a faulty disk exists in those disks. Therefore, the process of identifying the faulty disk may be performed to the disks. The same loop diagnostic method can be used in the step S1097.

Practically, there are many cases that abnormalities occur in the both loops because of a failure of one disk. Therefore, in the step S1097, it is acceptable to check whether the loop abnormality occurs again by connecting all disks other than the disk determined as faulty to the FC-AL B 42, considering the result of the step S1094. However, there is a case, though it is rare, that one loop in each of the two disks fails at the same time so that two loop abnormalities occur. In this case, the loop abnormality occurs again. Therefore, the diagnosis should be continued so as to identify another faulty disk causing the loop abnormality in the FC-AL B 42.

OTHER EMBODIMENTS

In the aforementioned embodiment, when the heartbeat monitors A 511 and B 521 in the enclosure service units A 51 and B 52 detect both loop abnormalities, all disks 21 to 2N are detached from the FC-AL A 41 and from the FC-AL B 42 by the loop connection controllers A 513 and B 523, so as to resolve both loop abnormalities. However, the present invention is not limited to the aforementioned embodiments. In the present invention, it is acceptable that all disks 21 to 2N are detached from one FC-AL, for example, the FC-AL B 42, but are connected to the other FC-AL A 41. In this case, a loop abnormality in the FC-AL B 42 is resolved but a loop abnormality in the FC-AL A 41 is not resolved. This state is quite similar to that of a loop abnormality which occurs only in one loop. In this case, a loop diagnosis to identify a faulty disk among the disks connected to the FC-AL A 41 can be performed by accessing from the disk controller A 71 to the enclosure service unit A 51 through the FC-AL B 42 having no loop abnormality, with the same method described in the step S1045. Then, detaching the disk determined as faulty in the loop diagnosis, the loop abnormality in the FC-AL A 41 can be resolved. Then, a loop diagnosis of the other FC-AL B 42 can be performed by the same method as that of the step S1045.

In the aforementioned embodiment, the present invention is applied to the disk array apparatus in which one FC-AL connects to each of the disk controllers A 71 and B 72. However, the present invention is not limited to this structure. The present invention may be applied to a disk array apparatus in which a plurality of FC-ALs connect to each of the disk controllers A 71 and B 72, an example of which is shown in FIG. 9.

Figure 9:
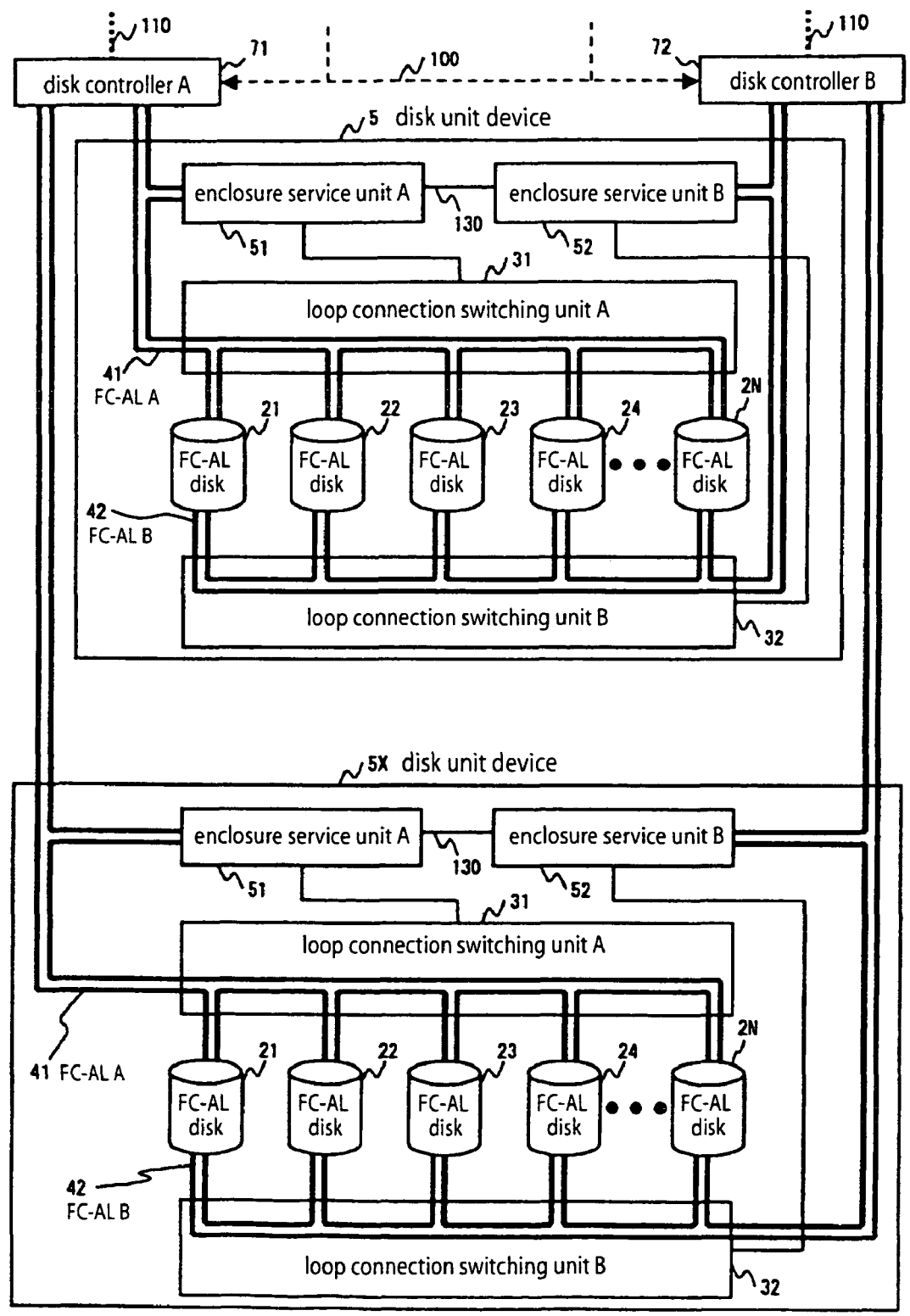
FIG. 9 is a block diagram showing another example of a disk array apparatus to which the present invention is applied.

A disk array apparatus shown in FIG. 9 includes two disk unit devices, or a disk unit device 5 and the similar disk unit device 5X. FC-ALs A 41 of the both disk unit devices connect to a disk controller A 71, and FC-ALs B 42 of the both disk unit devices connect to a disk controller B 72. That is to say, two independent disk unit devices 5 and 5X connect to the disk controllers A 71 and B 72 in parallel. In the disk array apparatus shown in FIG. 1 which only includes the disk unit 5, disk array is formed by using the disks in the disk unit 5. However, the disk array apparatus shown in FIG. 9 can form the disk array by combining disks in the different disk unit device in addition to the disk array shown in FIG. 1. For example, a disk 21 in the disk unit device 5 and a disk 21 in the disk unit device 5X can form a disk array of RAID1. In this case, even when dual loop abnormalities occur in either one of the disk unit devices, disk processing can be continued in the other disk unit device, so that the reliability is improved. Note here that when dual loop abnormalities occur in each of the disk unit devices 5 and 5X, processing is basically the same as that of the disk array apparatus shown in FIG. 1.

In the aforementioned embodiments, the present invention is applied to a disk array apparatus in which one enclosure service unit connects to one FC-AL. However, the present invention is not limited to this structure, and it is applicable to a disk array apparatus in which a plurality of enclosure service units connect to one FC-AL. An example of which is shown in FIG. 10.

Figure 10:
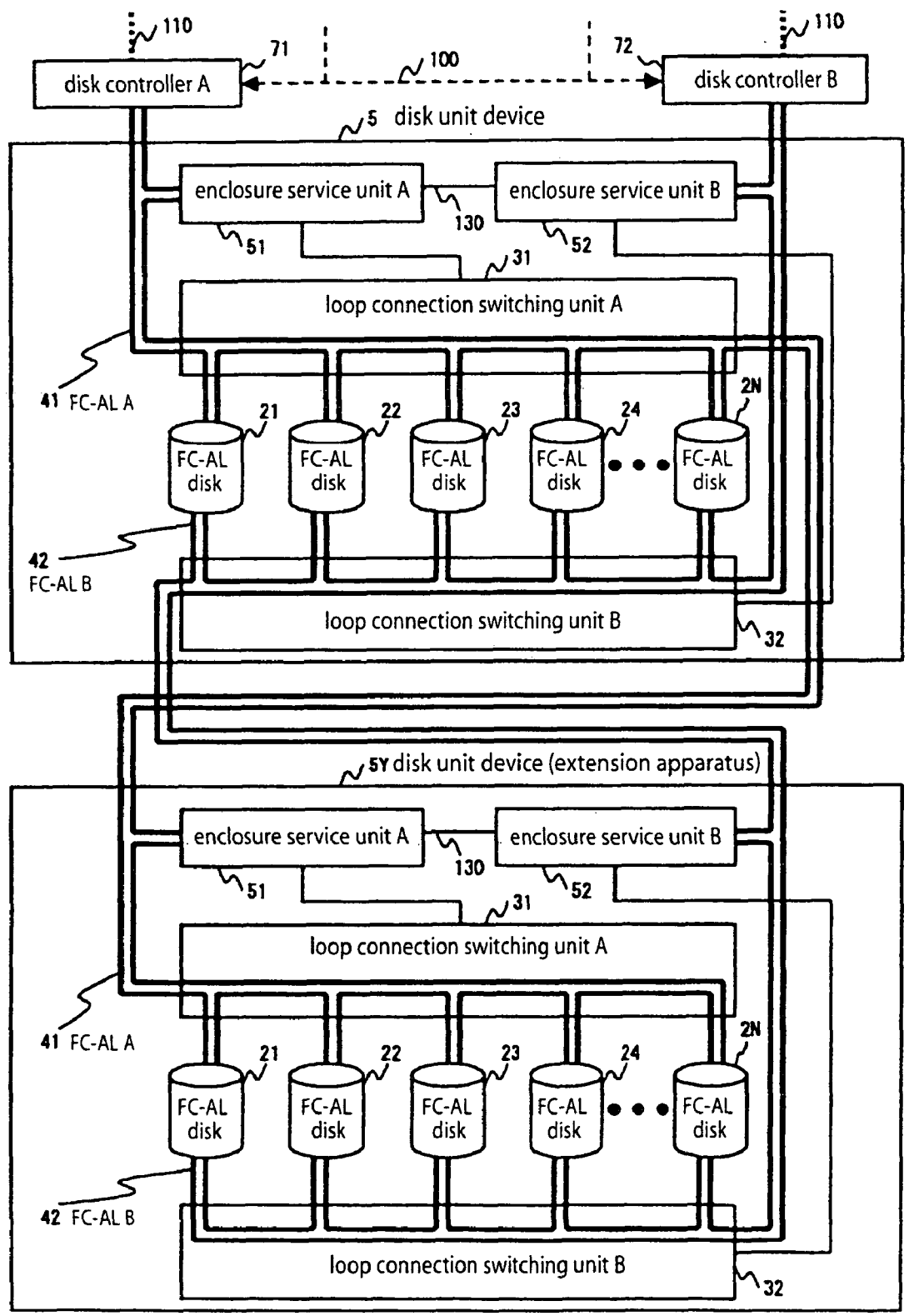
FIG. 10 is a block diagram showing still another example of a disk array apparatus to which the present invention is applied.

In a disk array apparatus shown in FIG. 10, the number of disks connecting to each of the FC-ALs A 41 and B 42 is extended by a disk unit device 5Y (extension apparatus) which is similar to the disk unit device 5. In this case, each of the basic apparatus having the disk unit device 5 and the extension apparatus having the disk unit device 5Y has one enclosure service unit per one loop, respectively. Therefore, enclosure service units 51 and 52 arranged in respective loops in the disk unit device 5 are connected by an interface 130 so as to communicate each other, and enclosure service units 51 and 52 arranged in the respective loops in the disk unit device 5Y are also connected by an interface 130 so as to communicate each other. Further, heartbeat commands from disk controllers A 71 and B 72 are transmitted to all enclosure service units connected to the same loop. Each enclosure service unit, when detecting loop abnormalities in the both loop, detaches all disks connecting to the basic apparatus or the extension apparatus, in which the enclosure service unit itself is provided.

Embodiments of the present invention have been explained above. However, the present invention is not limited to the aforementioned embodiments and is possible to accommodate other various additions and modifications. For example, although the enclosure service unit detects a loop abnormality by recognizing that reception of heartbeat commands ceased, it is acceptable that the same function as the loop abnormality detecting function in the disk controller may be provided in the enclosure service unit.

Further, the aforementioned program is recorded on a computer-readable storage medium and traded.

As described above, the present invention has the following effects.

In a system including, controlling devices such as enclosure service devices for controlling loop connection switching means which perform connecting/detaching of devices to/from loops, and multiplied loop interfaces to which the controlling devices directly connect, it is possible to perform detaching and reconnecting devices even though loop abnormalities occur at the same time in all of the loop interfaces. The reason is as follow. When abnormalities occur in all of the multiplied loop interfaces, they are detected by the controlling devices. The controlling devices voluntarily control the loop connection switching means so as to detach all devices connected to at least one loop interface from the loop, to thereby resolve at least one loop abnormality in one loop interface. Accordingly, it is possible to access to the controlling devices connected to the loop, and via the controlling devices, it is also possible to access to controlling devices connected to other loops.

In a system including, controlling devices such as enclosure service devices for controlling loop connection switching means which perform connecting/detaching of devices to/from loops, and multiplied loop interfaces to which the controlling devices directly connect, it is possible to perform loop diagnoses for identifying faulty devices causing the loop abnormalities even when loop abnormalities occur at the same time in all of the loop interfaces. The reason is as follows. In order to perform loop diagnoses, it is required to detach and reconnect the devices connecting to the loop interfaces, which can be performed in the present invention.

In a system including, controlling devices such as enclosure service devices for controlling loop connection switching means which perform connecting/detaching of devices to/from loops, and multiplied loop interfaces to which the controlling devices directly connect, it is possible to prevent the system from being completely stopped even when loop abnormalities occur at the same time in all of the loop interfaces. The reason is that the loop diagnoses can be performed as aforementioned, so that the faulty components can be removed from the loops and the operation of the system can be resumed.

What is claimed is:

1. A method for analyzing a loop interface failure comprising:
   detecting whether abnormalities occur in first and second loop interfaces which are multiplexed and to which devices are connected;
   detecting whether receptions of commands have ceased in one of the first and second loop interfaces, which commands we regularly transmitted through the first and second loop interfaces to which the devices are connected;

informing the other of the first and second loop interfaces that the receptions of the commands have ceased; and when the abnormalities are detected in both the first and second loop interfaces, detaching all devices connected to at least one of the first and second loop interfaces.

2. The method for analyzing a loop interface failure as claimed in claim 1, wherein the detecting whether abnormalities occur in the first and second loop interfaces comprises:

when receptions of the commands have ceased in both the first and second loop interfaces, indicating that abnormalities occur in the first and second loop interfaces.

3. The method for analyzing a loop interface failure as claimed in claim 1, further comprising performing a loop diagnosis for identifying a faulty device by accessing one of the first and second loop interfaces, in which all of the devices were detached from the loop interface, from the other loop interface.

4. The method for analyzing a loop interface failure as claimed in claim 3, further comprising:

when the loop abnormalities occur in all of the multiplexed loop interfaces, judging whether the loop abnormality is resolved in a certain period of time;

when the loop abnormalities were resolved in the certain period of time, inquiring disk controlling means whether they detached all of the devices; and when all of the devices were detached by the disk controlling means, performing countermeasure processing against a double-route link failure including performing loop diagnosis.

5. The method for analyzing a loop interface failure as claimed in claim 4, wherein the certain period of time is longer than a period of time necessary for the disk controlling means to detach all of the devices when the loop abnormalities occur in all of the multiplexed loop interfaces.

6. The method for analyzing a loop interface failure as claimed in claim 3, wherein a device determined as faulty in the loop diagnosis is detached from the loop interface, and the loop interface is to be in use again.

7. The method for analyzing a loop interface failure as claimed in claim 6, wherein the loop diagnosis for identifying a faulty device is performed by accessing disk controlling means connected to one of the loop interfaces via the disk controlling means connected to the loop interface which is in use again.

8. A computer program tangibly embodied on a computer readable medium, said program enabling a computer to execute the method of claim 1.

9. A system for analyzing a loop interface failure comprising:

first and second loop connection switching means for connecting and detaching devices to and from respective first and second multiplexed loop interfaces;

first and second disk controlling means for controlling the first and second loop connection switching means; and a first communication means for transmitting and receiving data between the first and second disk controlling means;

wherein the first and second disk controlling means each have, when detecting that abnormalities occur in all of the loop interfaces, functions of outputting to the first and second loop connection switching means instructions to detach all devices connected to either one of the first and second loop interfaces; and wherein either of the first and second disk controlling means, when detecting that receptions of commands have ceased, which commands are regularly transmitted through the first and second loop interfaces to which the devices managed by the first and second disk controlling means are connected, inform via the first communication means to the other disk controlling means that the receptions of the commands have ceased.

10. A computer-readable storage medium recording thereon a program which causes a computer to execute each means as claimed in claim 9.

11. The system for analyzing a loop interface failure as claimed in claim 9, wherein when detecting that receptions of commands have ceased in all disk controlling means, detect that abnormalities occur in all of the loop interfaces.

12. The system for analyzing a loop interface failure as claimed in claim 9, wherein each of the first and second disk controlling means comprises loop diagnostic means for performing a loop diagnosis to identify a faulty device by accessing the other loop interface via the first communication means and the other disk controlling means, devices connected to the other loop interface having been detached so that the detected loop abnormality has been resolved.

13. The system for analyzing a loop interface failure as claimed in claim 12, wherein the loop diagnostic means detaches a device determined as faulty in the loop diagnosis from the other loop interface so as to allow the other loop interface to be in use again.

14. The system for analyzing a loop interface failure as claimed in claim 13, wherein the loop diagnostic means is arranged to perform the loop diagnosis for identifying a faulty device by accessing the loop interface which is in use again.

15. The system for analyzing a loop interface failure as claimed in claim 9, further comprising:

first and second enclosure service means, each of which connects to the respective disk controlling means and to the devices through one loop interface of the multiplexed loop interfaces; and a second communication means for transmitting and receiving data between the loop interfaces;

wherein either of the first and second enclosure service means controls the loop connection switching means when abnormalities are detected in all of the loop interfaces so as to detach all devices connected to either loop interface.

16. The system for analyzing a loop interface failure as claimed in claim 15, wherein each of the enclosure service means comprises, when detecting that a reception of commands has ceased, which commands are regularly transmitted through a loop interface to which devices managed by the enclosure service means are connected, means for informing via the second communication means to the other enclosure service means that the reception of commands has ceased, and when detecting that receptions of commands have ceased in all of the enclosure service means, detects that abnormalities occur in all of the loop interfaces.

17. The system for analyzing a loop interface failure as claimed in claim 15, wherein each of the enclosure service means, when the loop abnormalities occur in all of the multiplexed loop interfaces managed by the enclosure service means, judge whether the loop abnormalities are resolved in a certain period of time, and when the loop abnormalities were resolved in the certain period of time, inquires the first and second disk controlling means whether they detached all of the devices, and when all of the devices are detached by the disk controlling means, performs countermeasure processing against a double-route link failure including a loop diagnosis.

18. The system for analyzing a loop interface failure as claimed in claim 17, wherein the certain period of time is longer than a period of time necessary for the first and second disk controlling means to detach all of the devices when the loop abnormalities occur in all of the multiplexed loop interfaces.

19. The system for analyzing a loop interface failure as claimed in claim 15, wherein each of the enclosure service means monitors abnormalities in a plurality of loop interfaces.

20. The system for analyzing a loop interface failure as claimed in claim 9, wherein the loop interface comprises a Fibre Channel Arbitrated Loop (FC-AL).

21. The system for analyzing a loop interface failure as claimed in claim 9, wherein the devices comprise hard disk devices.

22. The system for analyzing a loop interface failure as claimed in claim 9, wherein each of the disk controlling means monitors abnormalities in a plurality of loop interfaces.

23. A disk unit device, comprising:
   first and second enclosure service means for connecting to a disk controlling means;
   first and second loop connection switching means connected to a respective enclosure service means; and
   devices whose connections to first and second loop interfaces are controlled by respective loop connection means;
   wherein the enclosure service means are arranged to communicate with each other, and to control the loop connection switching means when abnormalities are detected in all of the loop interfaces so as to detach all devices connected to at least one of the loop interfaces; and
   when detecting that a reception of commands has ceased, which commands are regularly transmitted through the first and second loop interface to which devices managed by the enclosure service means are connected, means for informing via the other loop interface to the other enclosure service means that the reception of commands has ceased.

24. The disk unit device as claimed in claim 23, wherein each of the enclosure service means comprises:
   when detecting that receptions of commands have ceased in all of the enclosure service means, means for informing that abnormalities occur in all of the loop interfaces.

25. The disk unit device as claimed in claim 23, wherein each loop interface comprises a Fibre Channel Arbitrated Loop (FC-AL).

26. The disk unit device as claimed in claim 23, wherein the devices comprise hard disk devices.

27. A computer program tangibly embodied on a machine readable medium that instructs a computer to execute each means as claimed in claim 23.

* * * * *